US 8,171,459 B2

(12) United States Patent
Oja et al.

(10) Patent No.: US 8,171,459 B2
(45) Date of Patent: May 1, 2012

(54) SYSTEM AND METHOD FOR SOFTWARE PERFORMANCE TESTING AND DETERMINING A FRUSTRATION INDEX

(75) Inventors: Scott Oja, Longmont, CO (US); Steve Tocco, Erie, CO (US); Bill Roth, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 835 days.

(21) Appl. No.: 12/272,623

(22) Filed: Nov. 17, 2008

(65) Prior Publication Data

US 2009/0138856 A1 May 28, 2009

Related U.S. Application Data

(60) Provisional application No. 60/988,596, filed on Nov. 16, 2007.

(51) Int. Cl.
*G06F 9/44* (2006.01)
(52) U.S. Cl. ......................................... 717/126; 717/124
(58) Field of Classification Search .......... 717/124–135; 714/37, 38.1
See application file for complete search history.

(56) References Cited

U.S. PATENT DOCUMENTS

| | | | | |
|---|---|---|---|---|
| 5,086,393 A * | 2/1992 | Kerr et al. | ...................... | 702/186 |
| 5,548,718 A * | 8/1996 | Siegel et al. | .................. | 714/38.1 |
| 5,903,453 A * | 5/1999 | Stoddard, II | ..................... | 700/79 |
| 7,028,290 B2 * | 4/2006 | Srivastava et al. | ............. | 717/124 |
| 7,043,400 B2 * | 5/2006 | Stobie et al. | .................. | 702/183 |
| 7,165,074 B2 * | 1/2007 | Avvari et al. | .................. | 717/124 |
| 7,222,265 B1 * | 5/2007 | LeSuer et al. | ................. | 714/38.1 |
| 7,260,503 B2 * | 8/2007 | Stobie et al. | .................. | 702/183 |
| 7,415,635 B1 | 8/2008 | Annangi | | |
| 7,546,598 B2 * | 6/2009 | Blumenthal et al. | .............. | 718/1 |
| 7,827,529 B2 * | 11/2010 | Cockcroft et al. | ............. | 717/124 |
| 8,056,060 B2 * | 11/2011 | Bicheno et al. | ................ | 717/127 |
| 8,087,001 B2 * | 12/2011 | Hoyek et al. | ................... | 717/124 |
| 2003/0097650 A1 * | 5/2003 | Bahrs et al. | .................... | 717/124 |
| 2003/0159089 A1 * | 8/2003 | DiJoseph | ......................... | 714/38 |
| 2003/0204836 A1 * | 10/2003 | Srivastava et al. | ............. | 717/124 |
| 2003/0212924 A1 * | 11/2003 | Avvari et al. | ...................... | 714/38 |
| 2004/0143819 A1 * | 7/2004 | Cheng et al. | ................... | 717/125 |
| 2005/0015666 A1 * | 1/2005 | Kamani et al. | ................... | 714/25 |

(Continued)

OTHER PUBLICATIONS

Scheirer et al., "Frustrating the user on purpose: a step toward building an affective computer," 2002, Elsevier, p. 93-118.*
Lazar et al., "Help! I'm Lost: User Frustration in Web Navigation," 2003, Stanford University, p. 18-26.*
Performance Testing Software Systems: A Heuristic Approach, http://www.perftestplus.com/ptss_slides.pdf, 2006, 116 pages.

(Continued)

*Primary Examiner* — Wei Zhen
*Assistant Examiner* — Qing Chen
(74) *Attorney, Agent, or Firm* — Fliesler Meyer LLP (57) ABSTRACT

A system and method for determining a frustration index for a software suite based upon the measurements of the software's performance. The frustration index communicates the overall state of a customer's performance-related user experience as defined by a set of testing criteria and specified testing scenarios. Actual test measurements of one or more pre-specified criteria in one or more pre-specified testing scenarios or operating environments are first received, calculated or otherwise determined. Priority weights are provided for each of the pre-specified criteria in each of the pre-specified testing scenarios. Actual test measurements are then compared to target quantities, to provide a delta percentage between the actual measurements and the target quantities. The frustration index (or indices) is calculated as the result of a ratio of the delta percentage between the actual and the target to the priority weight of the criterion.

12 Claims, 10 Drawing Sheets

U.S. PATENT DOCUMENTS

| | | | |
|---|---|---|---|
| 2005/0110806 A1* | 5/2005 | Stobie et al. | 345/690 |
| 2005/0120341 A1* | 6/2005 | Blumenthal et al. | 717/158 |
| 2005/0229043 A1* | 10/2005 | Nasuti et al. | 714/38 |
| 2006/0107152 A1* | 5/2006 | Stobie et al. | 714/736 |
| 2006/0129892 A1 | 6/2006 | Diaconu | |
| 2006/0129994 A1* | 6/2006 | Srivastava et al. | 717/124 |
| 2007/0124353 A1* | 5/2007 | Cockcroft et al. | 708/200 |
| 2007/0220349 A1 | 9/2007 | Zhu | |
| 2008/0010539 A1 | 1/2008 | Roth | |
| 2008/0046791 A1* | 2/2008 | Bicheno et al. | 714/742 |
| 2008/0086660 A1* | 4/2008 | Wefers | 714/37 |
| 2008/0235633 A1 | 9/2008 | Ghiloni | |
| 2009/0007078 A1* | 1/2009 | Hoyek et al. | 717/131 |
| 2009/0199160 A1* | 8/2009 | Vaitheeswaran et al. | 717/124 |
| 2010/0100871 A1* | 4/2010 | Celeskey et al. | 717/124 |

OTHER PUBLICATIONS

Performance Test: Easy PC Benchmarking, http://www.passmark.com/products/pt.htm, Nov. 26, 2008, 3 pages.

Features of Webserver Stress Tool, http://www.paessler.com/webstress/features, Nov. 26, 2008, 2 pages.

HP Quality Center Suite, http://h10078.www1.hp.com/cda/hpms/display/main/hpms_content.jsp?zn=bto&cp=1-1, Nov. 26, 2008, 1 page.

SiSoftware Sandra—The Diagnostic Tool, Q&A Document, http://www.sisoftware.co.uk/index.html?dir=&location=qa&langx=en&a=, Nov. 26, 2008, 1 page.

QA Wizard Pro, http://www.seapine.com/qawizard.html, Nov. 26, 2008, 2 pages.

* cited by examiner

FIGURE 1

| Frustration Index Equation and Method for Calculating FI  160 |
|---|
| Let (A) = Inputted Equation Data: Actual measurements for specified performance testing scenarios<br><br>Let (B) = Set Equation Data: Target measurements, or an optimal target performance number based upon customer expectations<br><br>Let (D) = Priority weights: Based upon each testing scenario's frequency and importance to customers, for example, in some scenarios the following priorities can be used, Critical: 1; High: 3; Normal: 9; Low: 12<br><br>Then (C) = Delta Percentage calculated as the difference between the Actual and Target measurements<br><br>$$C = (A - B) / B$$<br><br>(FI) = Frustration Index Score calculated from the Delta% and the Priority Weight<br><br>$$FI = C / D$$<br><br>Frustration Index Equation:  $FI = (((A-B)/B)/D)$ |

| | "X" VM<br>"X" Hardware Configuration<br>"X" OS | | (A) Average Current Measurement | (B) Desired Measurement | % Delta between actual & requirement (C) | Priority Weight (D) | Weighted Score (C / D) = |
|---|---|---|---|---|---|---|---|
| Incremental | | Server Start | 19 sec. | 10 sec. | (45%) | 3 | (15) |
| | Deployment | sm App Scenario | 20 sec. | 15 sec. | (33%) | 3 | (11) |
| | | med App Scenario | 14 sec. | 15 sec. | +6.7% | 1 | 6.7 |
| | | lg App Scenario | 29 sec. | 20 sec. | (45%) | 3 | (15) |
| | Build | sm App Scenario | 2.5 sec. | 0.5 sec. | (400%) | 1 | (400) |
| | | med App Scenario | 0.3 sec. | 1.0 sec. | +70% | 1 | 70 |
| | | lg App Scenario | 4.0 sec. | 3.0 sec. | (33%) | 3 | (11) |
| | Debugging | sm App Scenario | 20 sec. | 17 sec. | (17.6%) | 1 | (17.6) |
| | | med App Scenario | 20 sec. | 22 sec. | +9.1% | 3 | 3 |
| | | lg App Scenario | 14 sec. | 16 sec. | +12.5% | 1 | 12.5 |
| | | Server Start | 15 sec. | 20 sec. | 25% | 3 | 8.3 |

*Numbers in parentheses denote negative numbers: (45%)

| | | Average Current Measurement | Desired Measurement | %Delta between actual & requirement (E) | Priority Weight (F) | Weighted Score (E / F) = |
|---|---|---|---|---|---|---|
| | Server Start | 19 sec. | 10 sec. | (45%)* | 3 | (15) |
| Deployment | sm App Scenario | 20 sec. | 15 sec. | (33%) | 3 | (11) |
| | med App Scenario | 14 sec. | 15 sec. | +6.7% | 1 | 6.7 |
| | lg App Scenario | 29 sec. | 20 sec. | (45%) | 3 | (15) |
| Build | sm App Scenario | 1.5 sec. | 0.5 sec. | (150%) | 1 | (150) |
| | med App Scenario | 0.3 sec. | 1.0 sec. | +70% | 1 | 70 |
| | lg App Scenario | 4.0 sec. | 3.0 sec. | (33%) | 3 | (11) |
| Debugging | sm App Scenario | 20 sec. | 17 sec. | (17.6%) | 1 | (17.6) |
| | med App Scenario | 20 sec. | 22 sec. | +9.1% | 3 | 3 |
| | lg App Scenario | 14 sec. | 16 sec. | +12.5% | 1 | 12.5 |
| | Server Start | 15 sec. | 20 sec. | 25% | 3 | 8.3 |

"X" VM — 212
"X" Hardware Configuration
"X" OS

Incremental

* Numbers in parentheses denote negative numbers: (45%)

Performance Testing Scenarios

| | Sample Application String | ** Current Average Measurement | * Std_Dev (seconds) | Target Requirement (seconds) | % Delta Between Actual & Requirement | Scenario Priority Weight | F1 Weighted Score | Notes |
|---|---|---|---|---|---|---|---|---|
| IDE Start Up | | | | | | | | |
| | | 36.68 | 0.6 | 20 | (78.30) | 3 | (28.10) | |
| Server Start | | | | | | | | |
| Warm Start | Small App. | 44.83 | 1.88 | 12 | (273.68) | 3 | (81.19) | |
| Warm Start | Med. App. | 43.48 | 2.86 | 15 | (189.87) | 3 | (83.29) | |
| Warm Start | Large App. | 107.28 | 42.88 | 20 | (438.46) | 3 | (145.48) | |
| Deployment | | | | | | | | |
| 1a. From a Fresh Project, Build and Deploy a Non-trivial Application for the First Time. | Small App. | 24.73 | 0.7 | 10 | (147.30) | 1 | (147.30) | |
| 1b. From a Fresh Project, Build and Deploy a Non-trivial Application for the First Time. | Med. App. | 35.48 | 3.38 | 15 | (138.63) | 1 | (138.63) | |
| 1c. From a Fresh Project, Build and Deploy a Non-trivial Application for the First Time. | Large App. | 141.41 | 3.24 | 20 | (807.06) | 1 | (807.06) | |
| 2a. Edit Web Service by Adding an Operation which will Include a New Signature and Implementation then Run on Server. | Small App. | 2 | | 2 | 0.00 | 1 | 0.00 | |
| 2b. Edit Web Service by Adding a Web Service Operation which will Include a New Signature and Implementation then Run on | Med. App. | 8 | | 5 | 0.00 | 1 | 0.00 | |
| 2c. Edit Web Service by Adding a Web Service Operation which will Include a New Signature and Implementation then Run on | Large App. | 12 | | 12 | 0.00 | 1 | 0.00 | |

FIG. 6A-1

| | | | | | | |
|---|---|---|---|---|---|---|
| 3a. Add an Action to a Page Flow then Run | Small App. | 2 | 2 | 0.00 | 1 | 0.00 |
| 3b. Add an Action to a Page Flow then Run | Med. App. | 8 | 5 | 0.00 | 1 | 0.00 |
| 3c. Add an Action to a Page Flow then Run | Large App. | 12 | 12 | 0.00 | 1 | 0.00 |
| 4a. Edit Page Flow by Adding Reference to a Service Control in a Utility Project then Run on | Small App. | 2 | 2 | 0.00 | 1 | 0.00 |
| 4b. Edit Page Flow by Adding Reference to a Service Control in a Utility Project then Run on | Med. App. | 8 | 5 | 0.00 | 1 | 0.00 |
| 4c. Edit Page Flow by Adding Reference to a Service Control in a Utility Project then Run on | Large App. | 12 | 12 | 0.00 | 1 | 0.00 |
| 5a. Edit Page Flow by Adding Reference to a Service Control in a Utility Project then Debug | Small App. | 2 | 2 | 0.00 | 3 | 0.00 |
| 5b. Edit Page Flow by Adding Reference to a Service Control in a Utility Project then Debug | Med. App. | 8 | 5 | 0.00 | 3 | 0.00 |
| 5c. Edit Page Flow by Adding Reference to a Service Control in a Utility Project then Debug | Large App. | 12 | 12 | 0.00 | 3 | 0.00 |

Incremental Build

| | | | | | | |
|---|---|---|---|---|---|---|
| 1a. Add Action to a Page Flow. | Small App. | 1 | | | 1 | 0.00 |
| 1b. Add Action to a Page Flow. | Med. App. | 1 | | | 1 | 0.00 |
| 1c. Add Action to a Page Flow. | Large App. | 1 | | 1 | 1 | 0.00 |
| 2a. Add Method to Web Service. | Small App. | 1 | | 1 | 3 | 0.00 |
| 2b. Add Method to Web Service. | Med. App. | 1 | | 1 | 3 | 0.00 |
| 2c. Add Method to Web Service. | Large App. | 1 | | 1 | 3 | 0.00 |
| 3a. Edit XMLBean by Adding Two Complex Types to Scheme that Reference Each Other. | Small App. | 2 | | 2 | 3 | 0.00 |
| 3b. Edit XMLBean by Adding Two Complex | Med. App. | 2 | | 2 | 3 | 0.00 |
| 3c. Edit XMLBean by Adding Two Complex | Large App. | 2 | | 2 | 3 | 0.00 |
| 4a. Add Callback to Web Service. | Small App. | 1 | | 1 | 9 | 0.00 |
| 4b. Add Callback to Web Service. | Med. App. | 1 | | 1 | 9 | 0.00 |
| 4c. Add Callback to Web Service. | Large App. | 1 | | 1 | 9 | 0.00 |
| Server Stop | | | | | | |
| | Small App. | 12.78 | 0.01 | 5 | (166.80) | 9 | (17.31) |
| | Med. App. | 16.32 | 0.74 | 5 | (208.40) | 9 | (22.83) |
| | Large App. | 28.84 | 1.62 | 5 | (488.80) | 9 | (65.20) |

FIG. 6B-1

| | Small App. | Med. App. | Large App. | Overall |
|---|---|---|---|---|
| Server Start Scores | (81.18) | (83.28) | (146.48) | (288.87) |
| Deployment Index Scores | (147.30) | (138.63) | (807.05) | (880.88) |
| Incremental Build Index Scores | 0.00 | 0.00 | 0.00 | 0.00 |
| Server Stop Scores | (17.31) | (22.83) | (65.50) | (86.44) |
| Frustration Index Score: | (255.81) | (222.76) | (807.73) | (1286.29) |

SYSTEM AND METHOD FOR SOFTWARE PERFORMANCE TESTING AND DETERMINING A FRUSTRATION INDEX

CLAIM OF PRIORITY

This application claims the benefit of priority to U.S. Provisional Patent application titled "SYSTEM AND METHOD FOR SOFTWARE PERFORMANCE TESTING AND DETERMINING A FRUSTRATION INDEX", application Ser. No. 60/988,596, filed Nov. 16, 2007, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to software performance testing, and particularly to a system and method for determining a frustration index for a software suite based upon the measurements of the software's performance.

BACKGROUND

In the field of software engineering, performance testing is often performed during the development of a system or a software application, to determine how fast some aspect of that system or that software application performs under a particular workload. The testing can be used to validate and verify other attributes of the system, such as the system's scalability, or reliability. Performance testing can also serve a variety of end purposes: for example it can be used to compare two differently-configured systems to find which configuration performs better; or it can measure which parts of the system or which types of workload are likely to cause the system to perform badly. Performance testing can also be used, sometimes from a marketing perspective, to allow a software vendor to demonstrate that their particular system or software application meets (or fails to meet) the performance criteria or expectations set by a group of customers. With respect to a customer's objective and subjective expectations, performance testing may also demonstrate how well, or how poorly, the system performs against those expectations, and can provide a prospective customer with information they can then use to decide which system, or system configuration, is most likely to suit their needs.

Generally speaking, performance testing technology emulates the typical operating environment of the system or software application; and then often includes tests that measure the extremes of the environment that the system or the software will be operating within. Typically, a variety of tests are conducted and coordinated, while test values (metrics) and other performance data are gathered. These values, metrics, performance data, and other results are then analyzed to give a sense of the performance of the system.

In the field of application servers, and other server-related technologies, performance tests are mostly used by vendors to determine runtime characteristics, i.e. they are used as a measure of how the underlying system will perform at runtime at a particular customer's work site. In this context performance tests are very useful, and examples of such tests and benchmarks include "how many pages can be served up by the server in a particular amount of time?".

These types of performance test generally work on "standard applications". But they are not readily used with non-standard applications, nor are they readily used in an integrated development environment (IDE) or many other software development environments. Currently there is no good measure that can be used in the computer industry to signify how an IDE will perform. While some application server customers may desire certain characteristics as goals in their IDE environment, it is difficult to quantify these goals. Furthermore since it is difficult to quantify, it is similarly difficult for the software developer to develop an IDE suite that addresses those customer desires. This is the area the present invention is designed to address.

SUMMARY

In accordance with an embodiment a frustration index is calculated which communicates the overall state of a customer's performance-related user experience as defined by a set of testing criteria and specified testing scenarios. Frustration indices can be calculated on an individual criterion-by-criterion basis, as well as on an individual testing scenario basis. In this way, the most critical problem areas can be isolated and resolved. In accordance with an embodiment actual test measurements of one or more pre-specified criteria in one or more pre-specified testing scenarios or operating environments are first received, calculated or otherwise determined. Priority weights are provided for each of the pre-specified criteria in each of the pre-specified testing scenarios. The priority weights can be calculated on the basis of the importance to the end user that the actual measurement should be the same or better than the target quantity, as well as on the frequency at which the criterion is tested in the testing scenario. Actual test measurements are then compared to target quantities, to provide a delta percentage between the actual measurements and the target quantities. In accordance with an embodiment the frustration index (or indices) is the result of a ratio of the delta percentage between the actual and the target to the priority weight of the criterion. In this way, the user can easily identify the areas of highest concern and place most focus on resolving those areas.

DETAILED DESCRIPTION

The invention is generally related to software performance testing, and particularly to a system and method for determining a frustration index for a software suite based upon the measurements of the software's performance.

In the competitive world of software development, it is very important for a software manufacturer, developer, or vendor, to achieve and maintain a high level of customer satisfaction. One of the prevailing factors in customer satisfaction is the performance of the software product. A poorly performing product will lead to a frustrated customer, and a generally lower customer satisfaction. As such it is natural for a software vendor to try to develop the highest performing product, within his/her budget and time constraints.

However, not all performance measurements are equal in importance. Some performance measurements have a higher level of priority to the customer than others. Thus, a software vendor would often like to understand which performance measures make the most impact in the level of frustration to their customers. In some instances, it may be the deviation of the performance result from a target or desired performance result that controls the customer's frustration level. In other instances, it may be the combination of the specific performance criteria, together with the deviation from a target result, which provides the necessary insight into the level of customer frustration. These considerations become more complex if the vendor is developing a software development suite. In a software development suite, customer satisfaction must be determined over a varied customer base (e.g., ranging in size from small business users up to large enterprise customers); and a varied software application size (e.g., in the context of a development environment, if the customer is typically developing small, medium, or large software applications). The software, in this instance the software development suite, needs to be tested over each of the various stages of its use, for example start, deployment, build, debugging.

Embodiments of the present invention provide a system and method for determining a customer's performance frustration index of a system comprised of hardware and/or software. As used herein the system being tested for customer frustration can be any of a hardware or software-based system, including in some examples a software development suite. The system and method allows the isolation of those performance criteria causing the highest level of frustration to the customer based upon a customer's expectations, and the results compared against those expectations. The system and method also account for deviation from the customer expectation, and factor that parameter into the index calculation.

As described above, currently in the field of application servers, and other server-related technologies, performance tests are used to determine runtime characteristics, i.e. they are used only as a measure of how the underlying system will perform at runtime at a customer's site. In this context they are very useful in that they provide useful runtime information. However, the same techniques are not applicable for testing IDE environments, and currently there is no good measure of how an IDE will perform. While some application server customer's may desire certain characteristics in their IDE environment, it is difficult to quantify this Furthermore, since it is difficult to quantify, it is similarly difficult for the software vendor to develop an IDE suite that addresses their customer needs.

In accordance with an embodiment a frustration index is calculated which communicates the overall state of a customer's performance-related user experience as defined by a set of testing criteria and specified testing scenarios. Frustration indices can be calculated on an individual criterion-by-criterion basis, as well as on an individual testing scenario basis. In this way, the most critical problem areas can be isolated and resolved. In accordance with an embodiment actual test measurements of one or more pre-specified criteria in one or more pre-specified testing scenarios or operating environments are first received, calculated or otherwise determined. Priority weights are provided for each of the pre-specified criteria in each of the pre-specified testing scenarios. The priority weights can be calculated on the basis of the importance to the end user that the actual measurement should be the same or better than the target quantity, as well as on the frequency at which the criterion is tested in the testing scenario. Actual test measurements are then compared to target quantities, to provide a delta percentage between the actual measurements and the target quantities. In accordance with an embodiment the frustration index (or indices) is the result of a ratio of the delta percentage between the actual and the target to the priority weight of the criterion. In this way, the user can easily identify the areas of highest concern and place most focus on resolving those areas.

Figure 1:
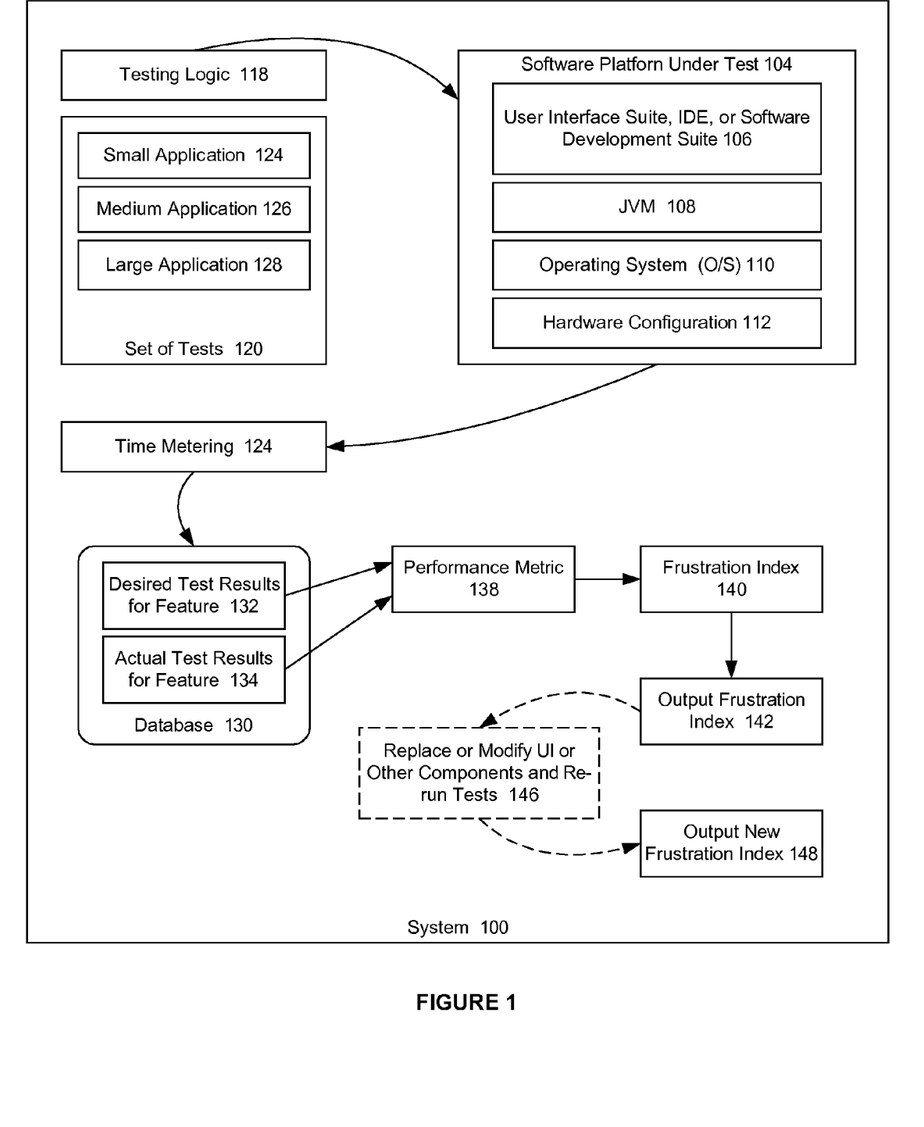
FIG. 1 illustrates a system for software performance testing and determination of a frustration index in accordance with an embodiment.

FIG. 1 illustrates a system for software performance testing and determination of a frustration index in accordance with an embodiment. As shown in FIG. 1, the system 200 comprises, or provides access to, a software platform under test 104. This in turn comprises a combination of one or more user interface, IDE, or software development suite 106, virtual machine or JVM 108, operating system (O/S) 110, and hardware configuration 112.

An example of the software development suite 106 includes the WebLogic Workshop product. Examples of the JVM 108 include JRockit, and the Sun JVM product from Sun Microsystems, Inc. Examples of the operating system 110 and hardware configuration 112 include Microsoft Windows, and Intel X86 processor computer, respectively.

As further shown in FIG. 1, a testing logic 118 applies a set of tests 120 to the software platform under test, including in some instances a variety of different test applications ranging from smaller sized applications 124 to medium applications 126 and large applications 128. Timers can be installed into the applications, and a timing meter 124 then used to determine the time it takes for various applications to perform various tasks in the user interface suite. The system then compares the desired test results for that feature 132, against the actual test results for that feature 134, the results of which may be optionally stored in a database 130 or other form of storage for subsequent retrieval and analysis. A performance metric 138 is then used to calculate the frustration index 140, and optionally output the frustration index 142 as a measure of the system's performance. If the system's configuration is changed, or components are replaced or modified in some manner, then the tests can be re-run 146. The new test results and frustration index 148 can then be used to make comparisons between the different system configurations.

The decision as to which features and testing scenarios are used to determine the frustration index can be based on feedback from customers about a particular product's features or performance. For example, customers, product managers, and users in the field, can elect feature areas for testing if those feature areas are perceived as potential bottlenecks, under-performing features that make it difficult for developers to accomplish day-to-day tasks, CPU-intensive operations, or frequently used features. Frequently, the software industry also suggests which features are more important to customers. This allows the system to generated target objective numbers that are actually based on a human viewpoint. In accordance with an embodiment a priority weight is then assigned to each objective. In some embodiments that utilize the frustration index technique for development of software systems, a product manager can create their product requirements document (PRD document) based on their targets and priority weights for their project. In accordance with an embodiment, testing can then be performed by placing listeners, meters or timers into the code, and then generating test results and other numbers from those meters. The test results, numbers, and any additional information can then be used to calculate the frustration index. For example, one might consider testing features to add a pageflow for a small application, or for a medium application. The actual selection of testing criteria can be based on customer feedback as to what features they need optimized, to help make them more efficient.

In accordance with some embodiments, a frustration index can be calculated across different platforms, (for example, between different operating systems, or different virtual machines or JVMs), to provide a comparison between those platforms, and to better tune a software development suite for running optimally on different platforms. Similarly, the frustration index can be used to determine how to tune a platform to better suit a particular software development suite. The system can be used to provide a roll-up score, which takes into account that, for some platforms, some areas are better than others, while other platforms may have completely different areas of better or poorer performance.

Figure 2:
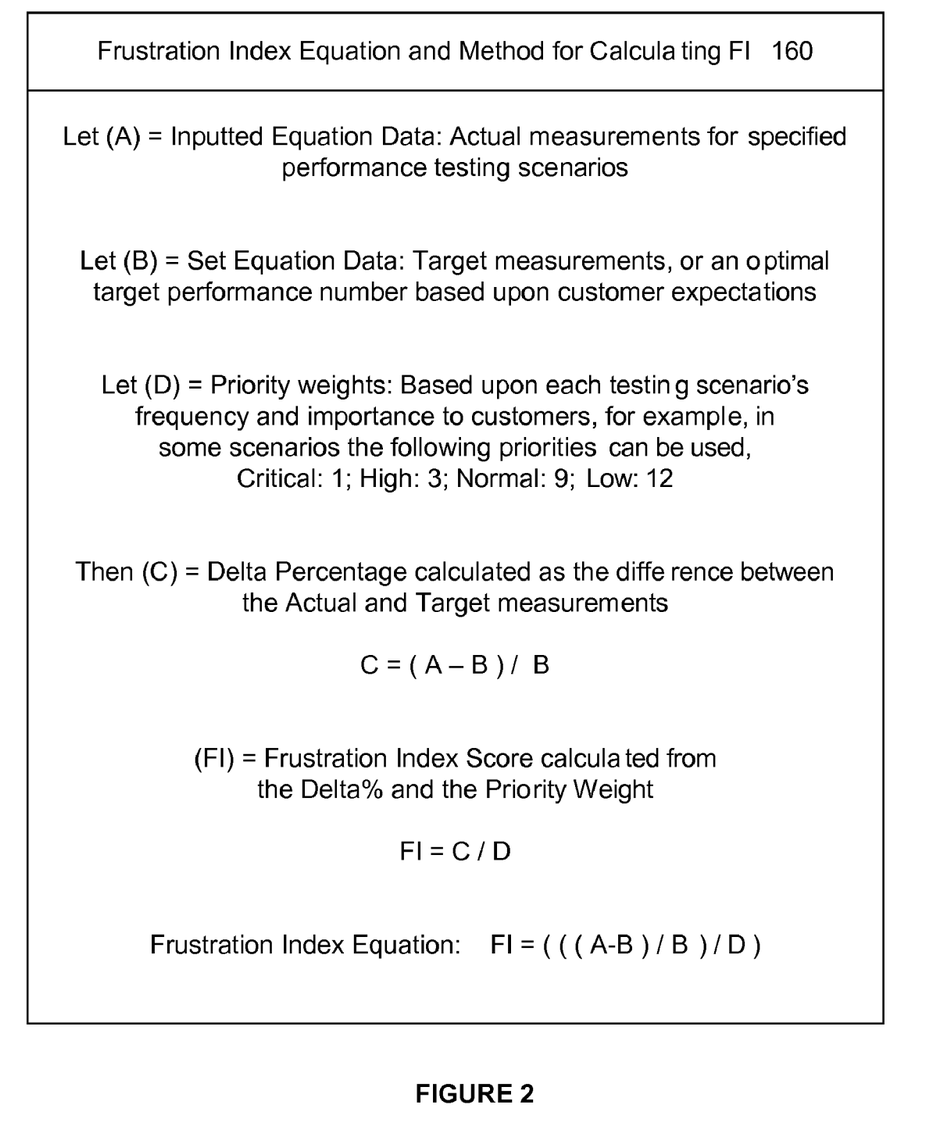
FIG. 2 illustrates an example of a frustration index in accordance with an embodiment.

FIG. 2 illustrates an example of a frustration index in accordance with an embodiment. As shown in FIG. 2, a first step is to let (A)=Inputted Equation Data. This can be actual measurements for specified performance testing scenarios. The next step is to let (B)=Set Equation Data. This can be target measurements, or an optimal target performance number based upon customer expectations. The system then retrieves any assigned (D)=Priority weights. These can be based upon each testing scenario's frequency and importance to customers, for example, in some scenarios the following priorities can be used, Critical: 1; High: 3; Normal: 9; Low: 12. Following the collection of data, targets, and priority weights, then (C)=delta Percentage calculated as the difference between the Actual and Target measurements, i.e. C=(A−B)/B. The frustration index Score (FI)=is calculated from the delta % and the Priority Weight, i.e. FI=C/D. The frustration index Equation can then be written as FI=(((A—B)/B)/D).

Figure 3:
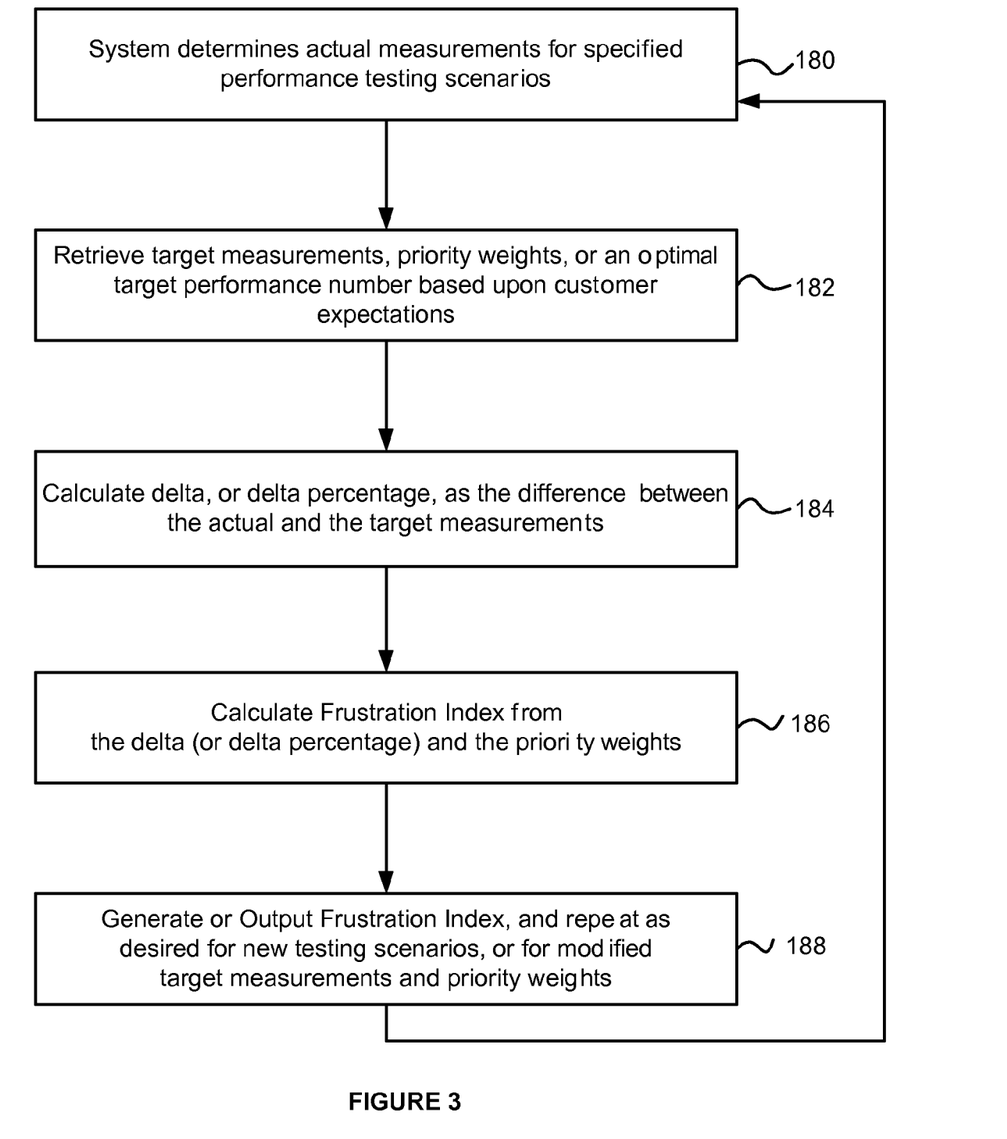
FIG. 3 illustrates a flowchart of a method for software performance testing and determination of a frustration index in accordance with an embodiment.

FIG. 3 illustrates a flowchart of a method for software performance testing and determination of a frustration index in accordance with an embodiment. As shown in FIG. 3, in step 180, the system determines actual measurements for specified performance testing scenarios. In step 182, target measurements, priority weights, or an optimal target performance number based upon customer expectations are retrieved. In step 184, the system calculates a delta, or delta percentage, as the difference between the actual and the target measurements. In step 186, the frustration index is calculated from the delta (or delta percentage) and the priority weights. In step 188, the system then generates, and optionally outputs the frustration index. In step 190, the process is repeated as desired for new testing scenarios, or for modified target measurements and priority weights.

Figure 4:
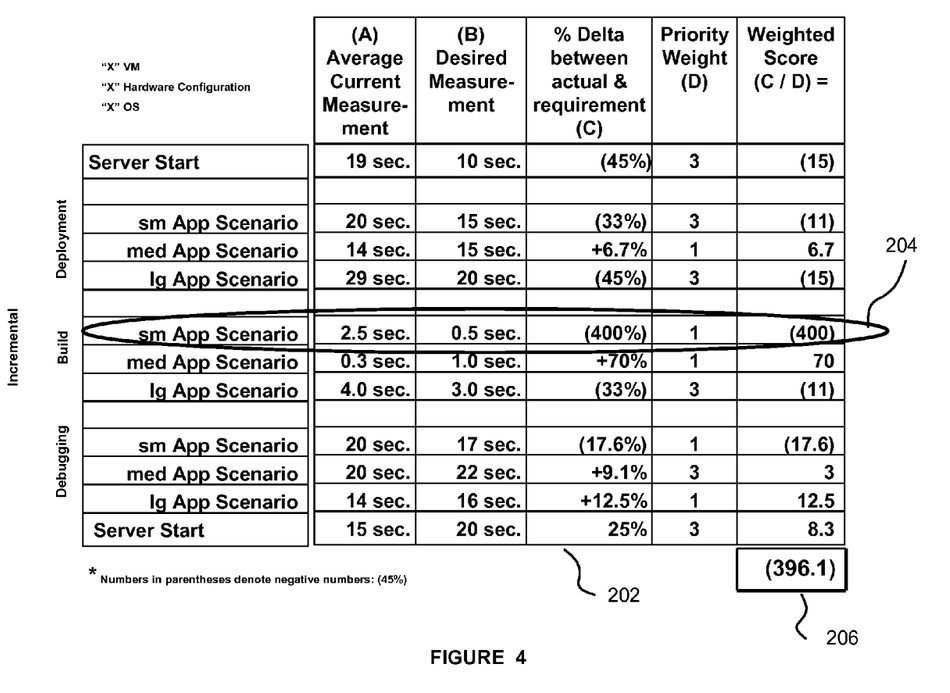
FIG. 4 illustrates an example of a calculation (in a spreadsheet-like output) of a frustration index in accordance with an embodiment.

FIG. 4 illustrates an example of a calculation (in a spreadsheet-like output) of a frustration index in accordance with an embodiment. As shown in FIG. 4, a first set of results 202, for a first configuration, indicates that, for a small application testing scenario 204 the average current measurement is 2.5 seconds. This is then compared to the desired measurement of 0.5 seconds, which results in a delta of 400%. For this particular scenario, the weighting or priority (a measure of its importance to the customer) is 1. The FI calculation will then calculate the weighted score for this scenario as 400. When used in combination with each of the other testing scenarios, the overall FI index 206 for this configuration is approximately 396.

Figure 5:
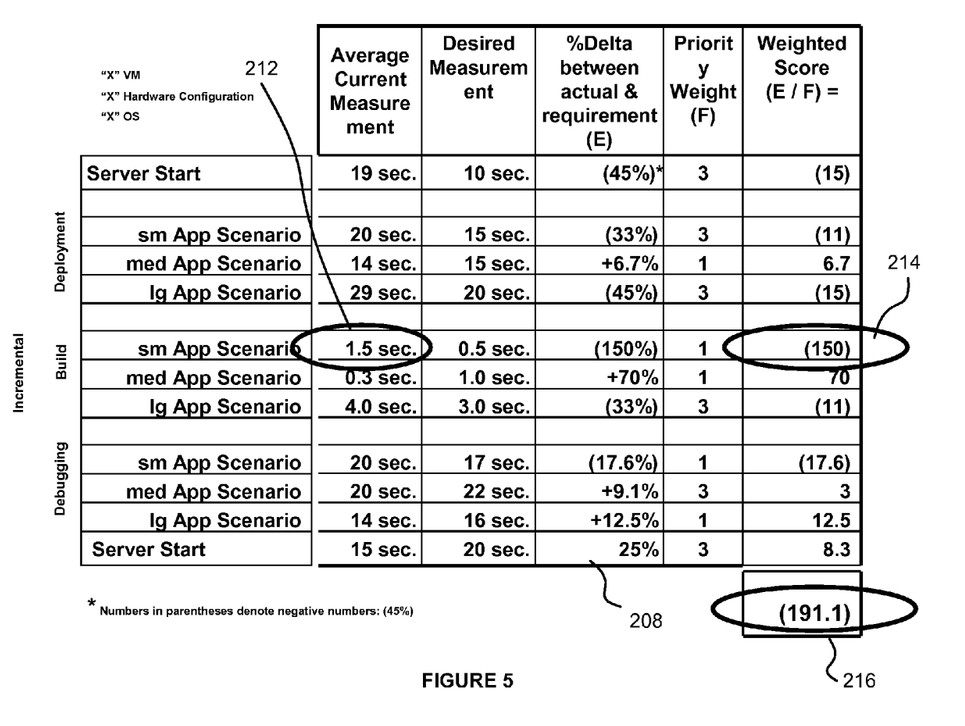
FIG. 5 illustrates another example of a calculation of a frustration index in accordance with an embodiment, showing how the frustration index varies with different testing results.
Figure 6A:
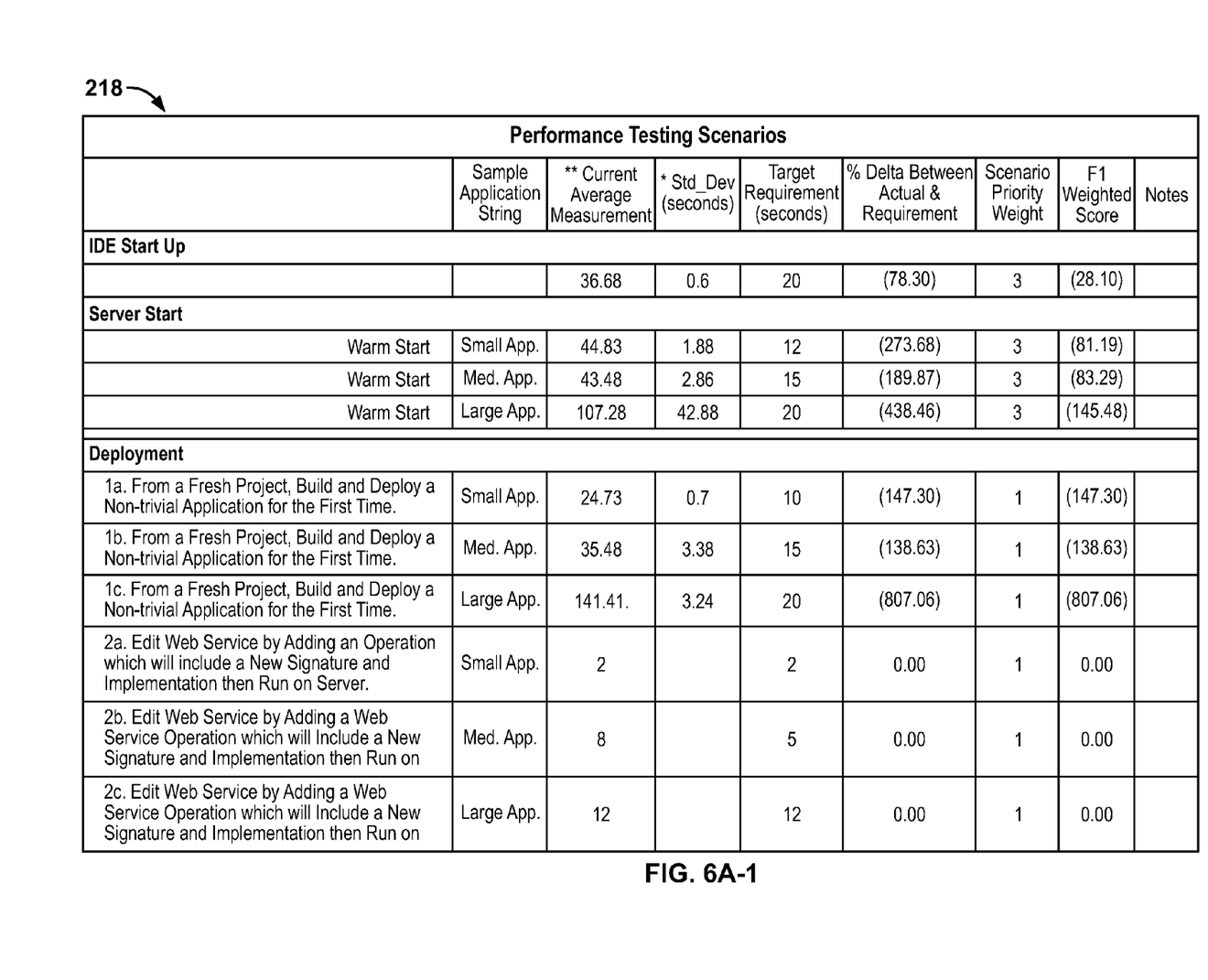
FIG. 6 illustrates an example of a calculation of a frustration index in accordance with an embodiment, showing how different scenarios are used to compare different system configurations.
Figure 6A:
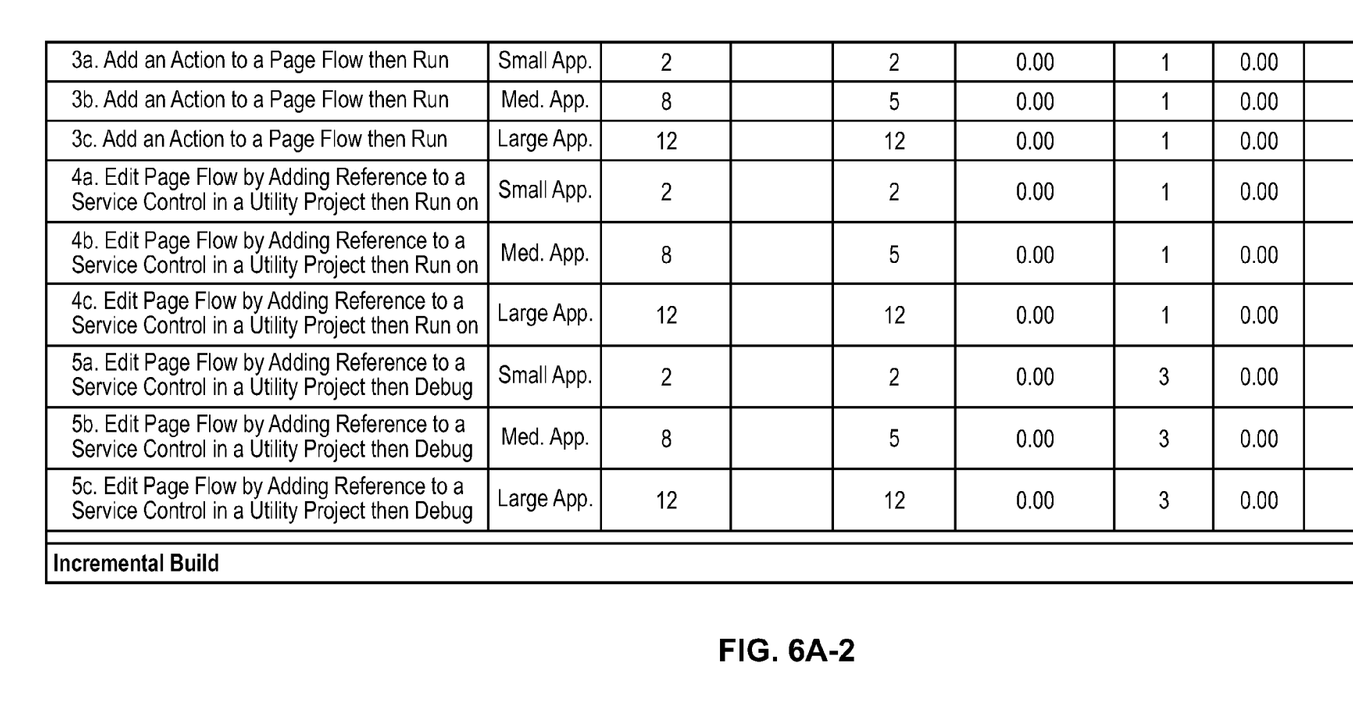
Figure 6B:
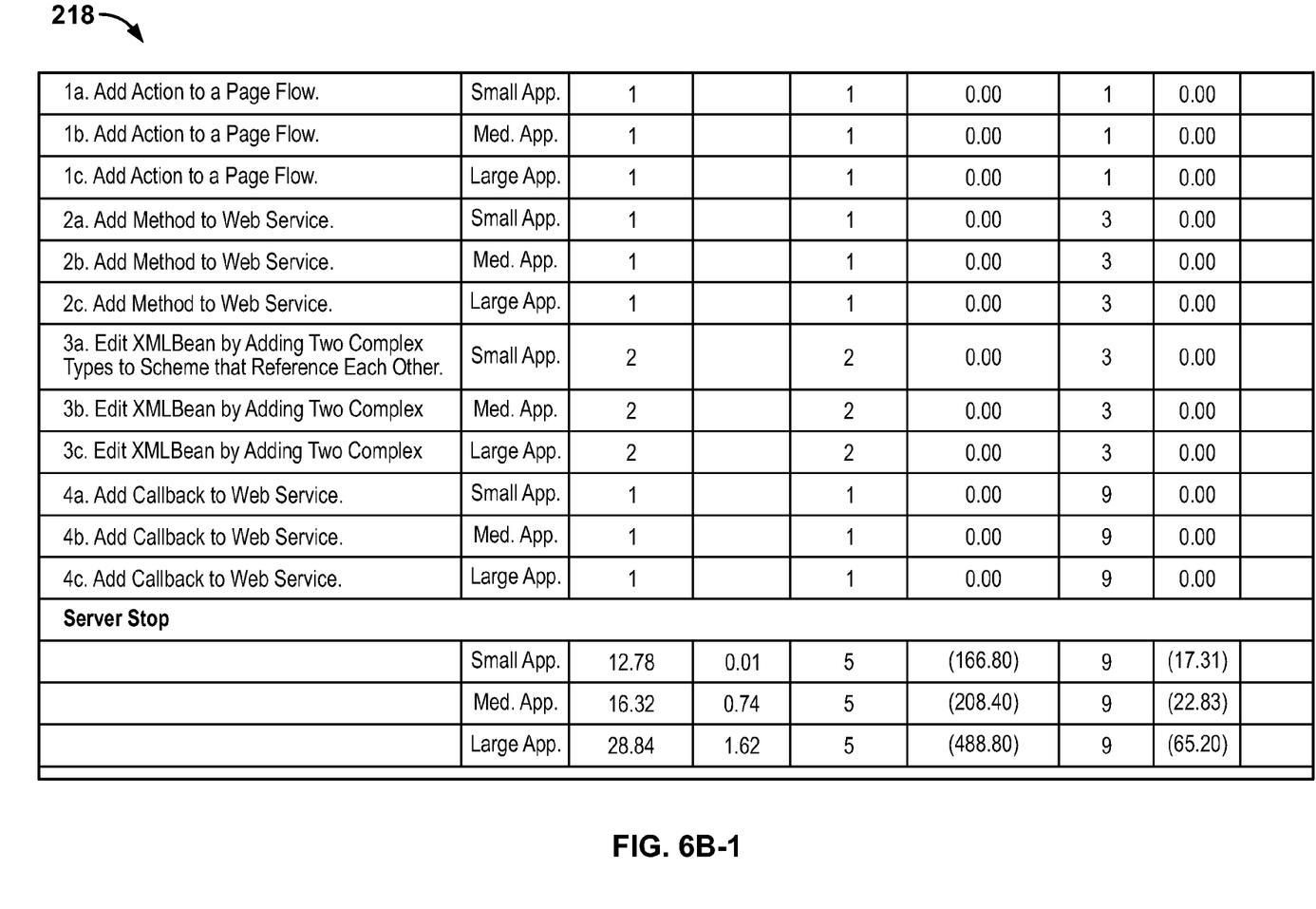
Figure 6B:
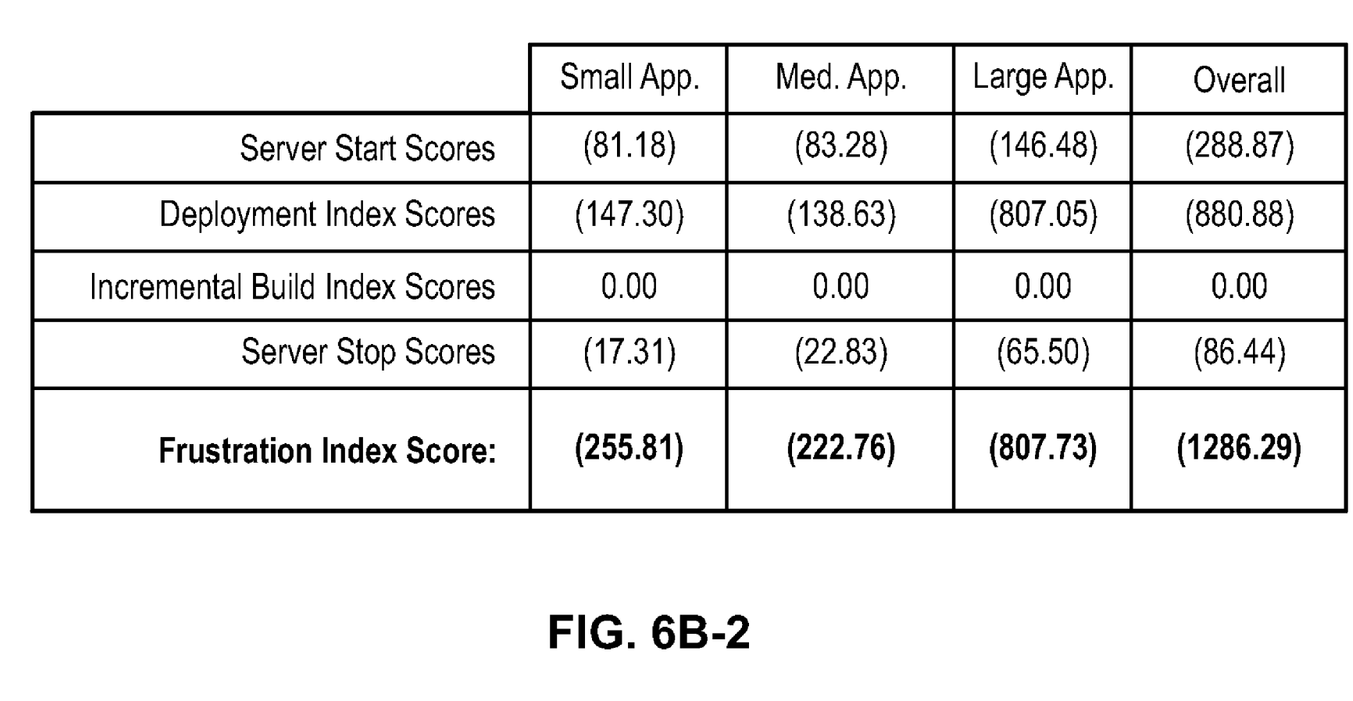

FIG. 5 illustrates another example of a calculation (again in a spreadsheet-like output) of a frustration index in accordance with an embodiment, showing how the frustration index varies with different testing results. As shown in FIG. 5, a second set of results 208, for a second configuration, indicates that, for the same small application testing scenario 204 the average current measurement is now 1.5 seconds. This is then compared to the desired measurement of 0.5 seconds, which results in a delta for this configuration of 150%. Again for this particular scenario, the weighting or priority is 1. For this new configuration the FI calculation will then calculate the weighted score for this scenario as 150. When used in combination with each of the other testing scenarios, the overall FI index 216 for this configuration has been reduced to approximately 191. This suggests that this configuration may be more attractive to the end user, since, taking into account all possible testing scenarios and permutations it more likely addresses the user's desired performance from the system.

FIG. 6 illustrates an example of a calculation of a frustration index in accordance with an embodiment, showing how different scenarios are used to compare different system configurations. As shown in FIG. 6, a variable set 218 of testing scenarios and features may be taken into account in calculating the frustration index, including such areas of software development as server start, deployment, incremental build, and server stop. Within each of these areas of performance measurement, individual features, such as editing a web service, or editing a page flow, may also be measured and used in calculating the frustration index.

Figure 7:
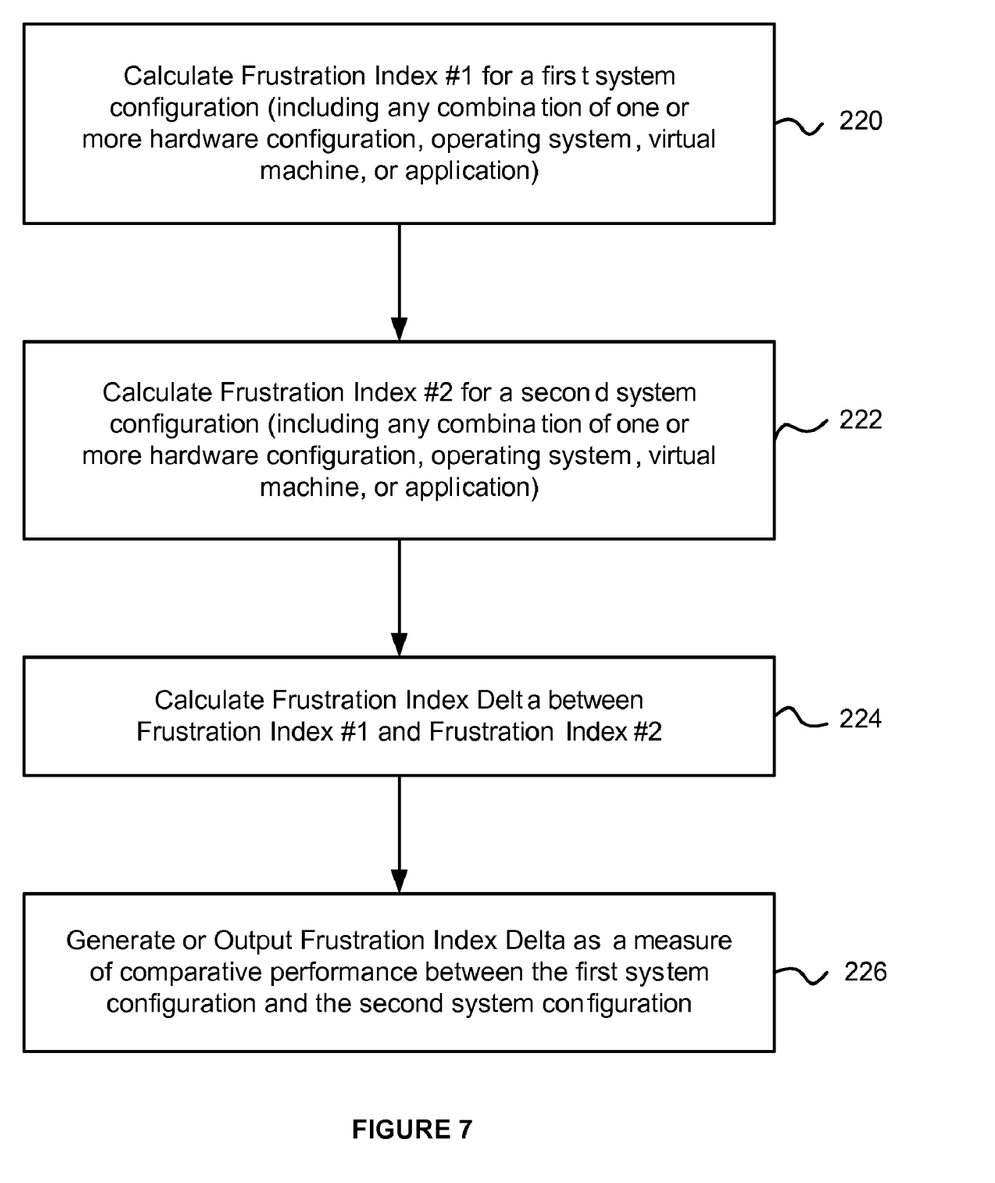
FIG. 7 illustrates a flowchart of a method for determination of a frustration index delta for different system configurations in accordance with an embodiment.

FIG. 7 illustrates a flowchart of a method for determination of a frustration index delta for different system configurations in accordance with an embodiment. As shown in FIG. 7, in step 220 the system is used to calculate a frustration index (referred to herein as frustration index #1) for a first system configuration (including any combination of one or more hardware configuration, operating system, virtual machine, or application). For example, this might correspond to the system configuration and the set of results shown in FIG. 4 above. In step 222, the system is subsequently used to calculate a frustration index (referred to herein as frustration index #2) for a second system configuration (again, including any combination of one or more hardware configuration, operating system, virtual machine, or application). For example, this might correspond to the system configuration and the set of results shown in FIG. 5 above. In step 224, the frustration index delta is calculated between frustration index #1 and frustration index #2. In step 226, the system can then generate, and optionally output, the frustration index delta as a measure of comparative performance between the first system configuration and the second system configuration.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The present invention may be conveniently implemented using a conventional general purpose or a specialized digital computer or microprocessor programmed according to the teachings of the present disclosure, as will be apparent to those skilled in the computer art. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above. Included in the programming (software) of the general/specialized computer or microprocessor are software modules for implementing the teachings of the present invention.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for calculating one or more frustration indices F for a user of a computer software application, comprising:
    a processor;
    a memory;
    a logic or software for receiving a set of target measurements B, each corresponding to one or more specified test criteria in one or more specified test scenarios and reflecting the user's expectation as to the performance of the computer software application;
    a logic or software for receiving a set of actual measurements A, each corresponding to measurements of the one or more specified test criteria in the one or more specified test scenarios;
    a logic or software for determining a priority weight D for each of the one or more specified test criteria;
    a logic or software for calculating one or more actual/target deltas or delta percentages C between each of the set of actual measurements and the set of target measurements by determining a difference between a target measurement and an actual measurement and dividing the difference by the target measurement; and
    a logic or software for calculating the one or more frustration indices F as ratios of the one or more actual/target deltas or delta percentages C to the corresponding priority weights D, wherein the one or more frustration indices F represent the user's satisfaction experience with the performance of the computer software application as defined by the one or more specified test criteria in the one or more specified test scenarios.

2. The system of claim 1 wherein the step of determining the priority weight D for each of the one or more specified test criteria further comprises the step of receiving information about the importance of each of the one or more specified test criteria to the user.

3. The system of claim 1 wherein the step of determining the priority weight D for each of the one or more specified test criteria further comprises the step of determining the frequency of testing of each of the one or more specified test criteria.

4. The system of claim 1 further comprising, following the step of calculating the one or more frustration indices F, the steps of:
    calculating an overall frustration index for a specified test scenario by summing the one or more frustration indices F for the specified test scenario; and
    calculating an overall frustration index for all specified test scenarios by summing the one or more frustration indices F for all specified test scenarios.

5. A method, executed by a computer, for calculating one or more frustration indices F for a user of a computer software application, comprising the steps of:
    receiving a set of target measurements B, each corresponding to one or more specified test criteria in one or more specified test scenarios and reflecting the user's expectation as to the performance of the computer software application;
    receiving a set of actual measurements A, each corresponding to measurements of the one or more specified test criteria in the one or more specified test scenarios;
    determining a priority weight D for each of the one or more specified test criteria;
    calculating one or more actual/target deltas or delta percentages C between each of the set of actual measurements and the set of target measurements by determining a difference between a target measurement and an actual measurement and dividing the difference by the target measurement; and
    calculating the one or more frustration indices F as ratios of the one or more actual/target deltas or delta percentages C to the corresponding priority weights D, wherein the one or more frustration indices F represent the user's satisfaction experience with the performance of the computer software application as defined by the one or more specified test criteria in the one or more specified test scenarios.

6. The method of claim 5 wherein the step of determining the priority weight D for each of the one or more specified test criteria further comprises the step of receiving information about the importance of each of the one or more specified test criteria to the user.

7. The method of claim 5 wherein the step of determining the priority weight D for each of the one or more specified test criteria further comprises the step of determining the frequency of testing of each of the one or more specified test criteria.

8. The method of claim 5 further comprising, following the step of calculating the one or more frustration indices F, the steps of:
    calculating an overall frustration index for a specified test scenario by summing the one or more frustration indices F for the specified test scenario; and calculating an overall frustration index for all specified test scenarios by summing the one or more frustration indices F for all specified test scenarios.

9. A computer readable storage medium, including instructions stored thereon which when read and executed by a computer cause the computer to perform a method for calculating one or more frustration indices F for a user of a computer software application, comprising the steps of:
- receiving a set of target measurements B, each corresponding to one or more specified test criteria in one or more specified test scenarios and reflecting the user's expectation as to the performance of the computer software application;
- receiving a set of actual measurements A, each corresponding to measurements of the one or more specified test criteria in the one or more specified test scenarios;
- determining a priority weight D for each of the one or more specified test criteria;
- calculating one or more actual/target deltas or delta percentages C between each of the set of actual measurements and the set of target measurements by determining a difference between a target measurement and an actual measurement and dividing the difference by the target measurement; and
- calculating the one or more frustration indices F as ratios of the one or more actual/target deltas or delta percentages C to the corresponding priority weights D, wherein the one or more frustration indices F represent the user's satisfaction experience with the performance of the computer software application as defined by the one or more specified test criteria in the one or more specified test scenarios.

10. The computer readable storage medium of claim 9 wherein the step of determining the priority weight D for each of the one or more specified test criteria further comprises the step of receiving information about the importance of that each of the one or more specified test criteria to the user.

11. The computer readable storage medium of claim 9 wherein the step of determining the priority weight D for each of the one or more specified test criteria further comprises the step of determining the frequency of testing of each of the one or more specified test criteria.

12. The computer readable storage medium of claim 9 further comprising, following the step of calculating the one or more frustration indices F, the steps of:
- calculating an overall frustration index for a specified test scenario by summing the one or more frustration indices F for the specified test scenario; and
- calculating an overall frustration index for all specified test scenarios by summing the one or more frustration indices F for all specified test scenarios.

* * * * *

UNITED STATES PATENT AND TRADEMARK OFFICE
CERTIFICATE OF CORRECTION

PATENT NO. : 8,171,459 B2  
APPLICATION NO. : 12/272623  
DATED : May 1, 2012  
INVENTOR(S) : Oja et al.

Page 1 of 1

It is certified that error appears in the above-identified patent and that said Letters Patent is hereby corrected as shown below:

In column 10, line 10, in Claim 10, delete "of that" and insert -- of --, therefor.

Signed and Sealed this  
Thirty-first Day of July, 2012

David J. Kappos  
*Director of the United States Patent and Trademark Office*